Oct. 31, 1950     J. J. KOOMAN     2,527,826
APPARATUS FOR PROCESSING KERNELS OF POPCORN
Original Filed July 10, 1946     4 Sheets-Sheet 1
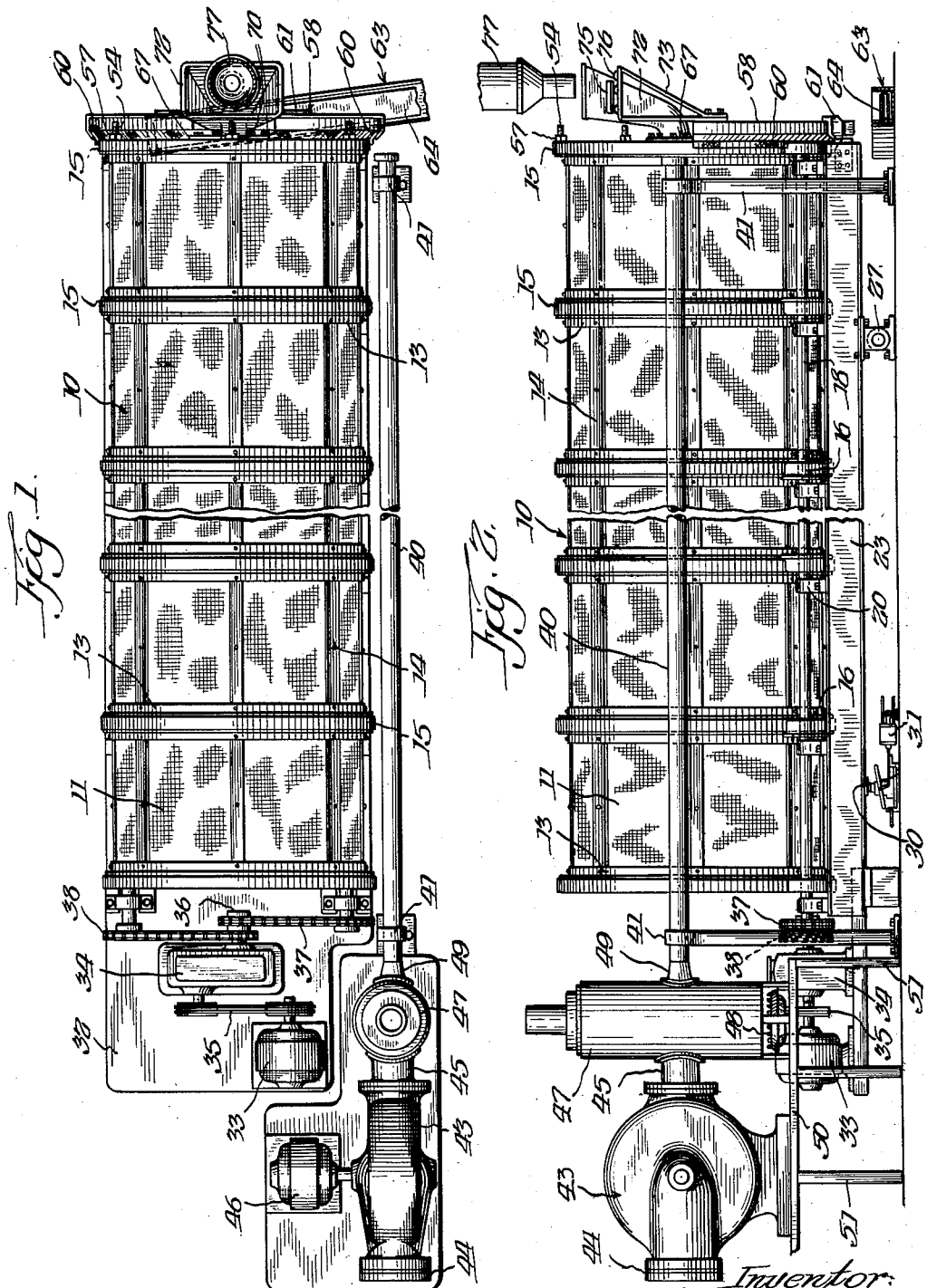
Inventor:
Jacob J. Kooman

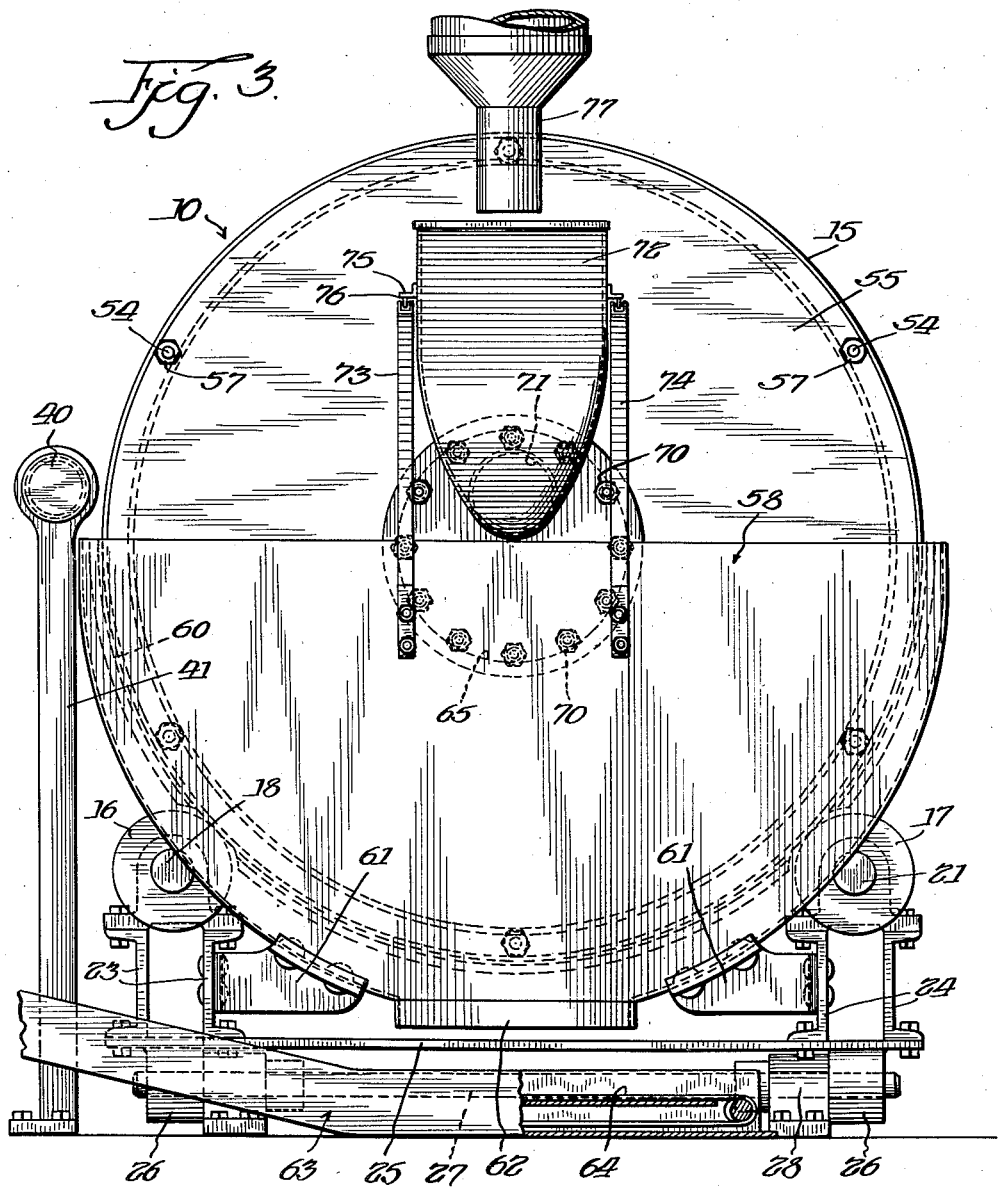

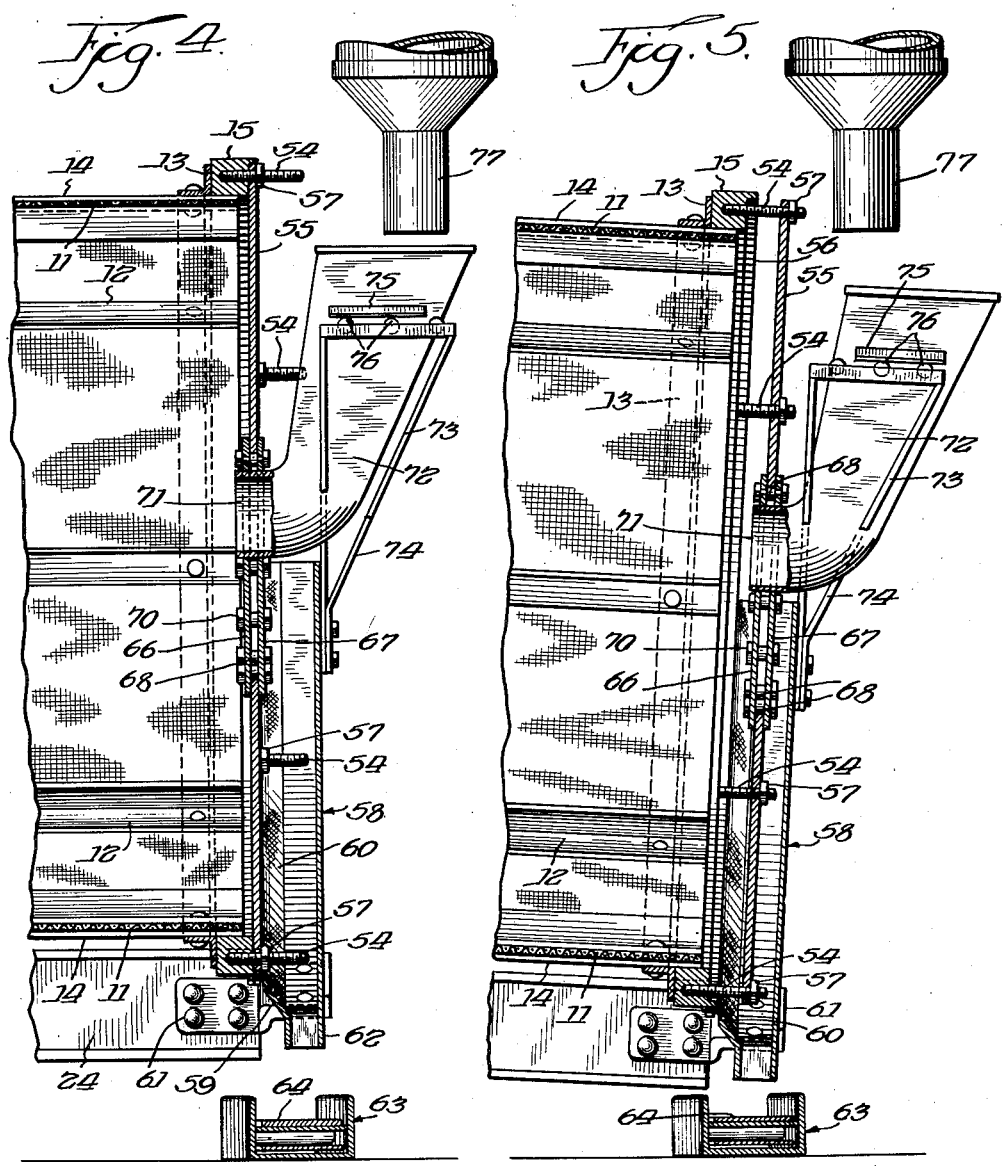

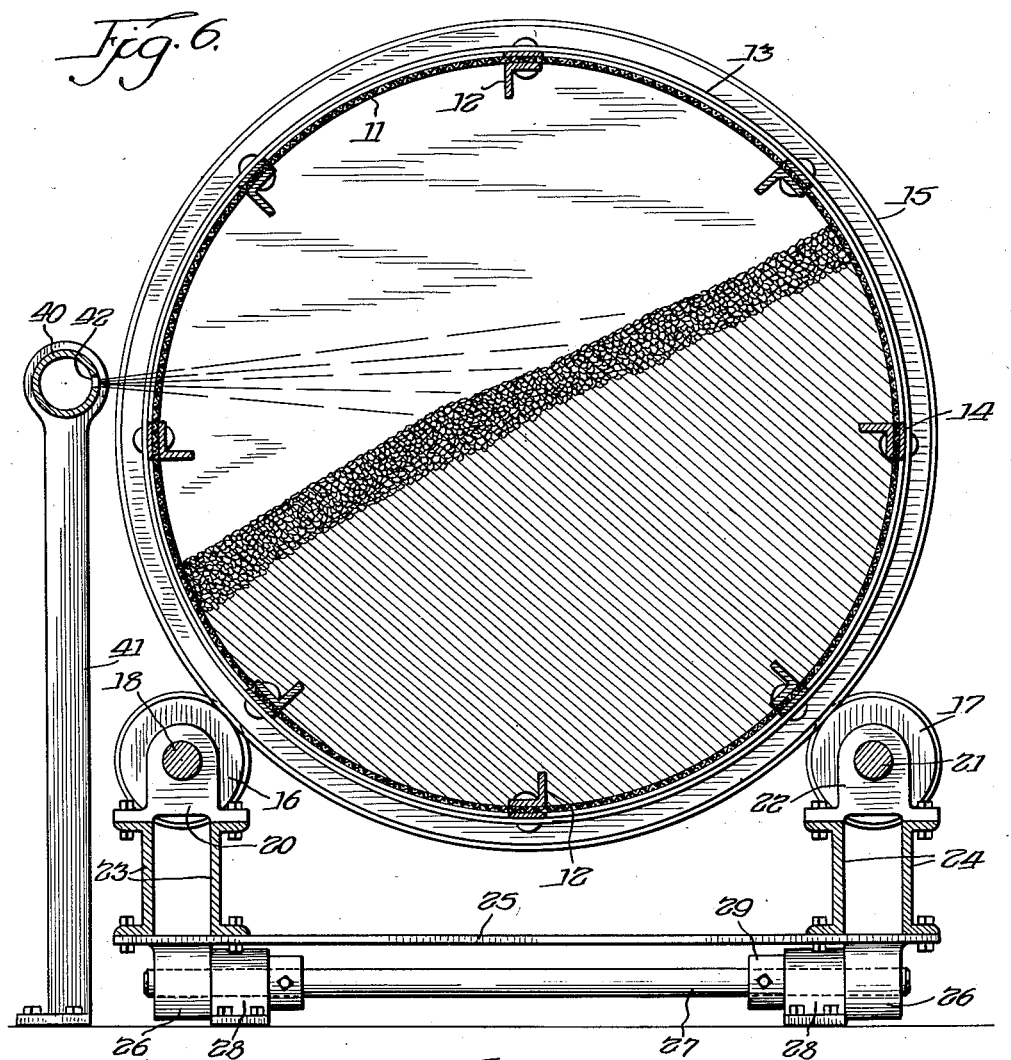

Patented Oct. 31, 1950

2,527,826

UNITED STATES PATENT OFFICE 2,527,826

APPARATUS FOR PROCESSING KERNELS OF POPCORN

Jacob J. Kooman, Chicago, Ill., assignor to Confections, Inc., Chicago, Ill., a corporation of Illinois Original application July 10, 1946, Serial No. 682,563. Divided and this application October 16, 1947, Serial No. 780,157

5 Claims. (Cl. 99—237)

The invention relates to a corn processing machine and has reference in particular to a machine of this character for processing kernels of popcorn to homogenize said kernels and thereby equalize the moisture content of the individual kernels for the purpose of improving the popcorn as to volume and for reducing waste.

The machine of the invention is especially designed for conditioning shelled popcorn. The kernels of popcorn vary as to moisture content, depending on the locality where the corn is grown and the conditions of humidity and temperature to which the corn is subjected during shipment to the plant where the popcorn is prepared as a confection. The present machine is of fairly large size so that a large number of bags of corn, ranging from approximately fifty to one hundred and fifty may be processed at one time. The particular characteristics and quality of each bag of shelled popcorn will vary at least to a limited extent and one object of the processing method and machine is to effect an even distribution of the corn throughout the mass undergoing the conditioning operation. Not only are the individual kernels from the various bags of corn thoroughly distributed as a result of agitation and mixing accomplished by the present machine but other desirable characteristics are imparted to the kernels by the agitation and distribution such as substantial uniformity of moisture content and increased hardness as regards the outer shell of the kernels, all of which improves the ability of the corn to pop and also effects an increase in the volume of the popped corn.

Another object of the invention resides in the provision of improved apparatus for processing shelled corn in a controlled atmosphere and which may be regulated for drying the kernels of corn as by an air blast or wherein water may be added if their moisture content is low.

Another and more specific object of the invention is to provide a tumbling barrel for tumbling and agitating shelled corn whereby to process the same as described, and which tumbling barrel will incorporate improved mechanism for filling and emptying the same.

With these and other objects in view the invention may consist of certain novel features of construction and operation as will be more fully described and particularly pointed out in the specification, drawings and claims appended hereto.

In the drawings which illustrate an embodiment of the invention and wherein like reference characters are used to designate like parts—

Figure 1 is a plan view of the tumbling barrel and associated structure comprising the corn processing machine of the invention;

Figure 2 is a side elevational view of the mechanism shown in Figure 1;

Figure 3 is an end view on an enlarged scale illustrating improvements incorporated in the tumbling barrel whereby the filling and emptying of the barrel is facilitated;

Figure 4 is a fragmentary longitudinal sectional view taken vertically through the end structure of the tumbling barrel showing the same in closed position;

Figure 5 is a fragmentary longitudinal sectional view of the tumbling barrel showing the same in open position with the barrel tilted for the purpose of emptying the same;

Figure 6 is a vertical transverse sectional view through the tumbling barrel illustrating the formation of a diagonal surface of corn which is produced by rotation of the barrel when filled to operating capacity; and Figure 7 is a fragmentary view in side elevation of the air discharge pipe.

Referring more particularly to the drawings, the processing machine of the invention is shown in Figures 1 and 2 as including a tumbling barrel designated in its entirety by numeral 10 and consisting of a cylindrical frame of wire mesh screening 11 which is reinforced on the inside of the barrel by angle pieces 12, Figure 6, located in spaced relation around the inside circumference of the barrel. The angle pieces 12 are suitably secured to metal bands 13 having encircling relation with the exterior of the metal screen so that the resulting framework is sufficiently rugged and durable for performing its required functions. Rigidity of the barrel is further increased by the longitudinal metal strips 14 extending from end to end of the tumbling barrel and which have secured relation to the circular bands 13. The metal rims 15 also add to the rigidity of the tumbling barrel, the said rims being suitably secured to the bands 13 and strips 14 and which rims provide the necessary supporting structure for supporting the barrel for rotation on rollers 16 and 17 disposed on the respective sides of the barrel. On each side of said barrel the rollers are equal in number to the rims 15 and they are positioned so as to contact said rims. Rollers 16, Figures 2 and 6, are fixed to a longitudinally extending shaft 18 and which shaft is journalled for rotation by bearings 20. The rollers 17 are similarly fixed to a longitudinally extending shaft 21 and said shaft is journalled for rotation by the bearings 22.

The bearings 20 and 22 are supported by framework which is best shown in Figures 2 and 6, the same including pairs of channel members 23 and 24 positioned in back to back relation, respectively, and being secured to transverse plates such as 25. It will be seen that the bearings 20 are secured to the channel members 23, whereas, the bearings 22 are secured to channel members 24. The plate indicated by numeral 25 has suitably secured thereto on the undersurface of the same at its respective ends the depending bearings 26 which receive the projecting ends of the pivot shaft 27, the said shaft passing through and being supported for rotation by the stationary bearings 28 which rest upon the floor or other foundation provided for the processing machine of the invention. Collars 29 are located on the shaft 27 to the inside of the stationary bearings 28 for the purpose of centering the shaft. The pivot shaft 27 is positioned relatively adjacent the discharge end of the tumbling barrel and said shaft permits tilting movement of the tumbling barrel for emptying purposes. The end section of the supporting structure opposite the discharge end is connected by a transverse plate 30 and said plate has operative association with hydraulic mechanism indicated by numeral 31, the same being positioned and having operation to elevate the said rear end of the supporting structure and thus the tumbling barrel whereby the discharge end is lowered, as will be evident from an inspection of Figure 5. The hydraulic mechanism may be of any conventional type and the invention does not contemplate tilting of the barrel to an excessive degree since the same is not necessary. An inclination of from five to ten degrees is sufficient for all practical purposes, the said inclination having the effect of producing travel of the corn as the tumbling barrel rotates toward the emptying end of the barrel, that is, the right hand end as shown in Figure 1.

At the rear end beyond the barrel the supporting structure including the channel members 23 and 24 are again joined by a transverse plate 32 and which provides a supporting surface for the electric motor 33 and the gear reducing mechanism 34 operatively connected to the motor by means of endless belts 35. The operating shaft 36 of the gear reducing mechanism carries a pair of pinions which drive chain belts 37 and 38, respectively, the belts in turn passing around a sprocket on the driving shafts whereby shaft 18 is driven by belt 37, and shaft 21 is driven by belt 38. It will be seen that both shafts have rotation in a clockwise direction, Figure 6, to drive the tumbling barrel in a counterclockwise direction.

Drying apparatus is provided in connection with the tumbling barrel for effecting a drying operation on the shelled corn in the event its moisture content is high. For the purpose the air pipe 40 extends along the left side of the barrel, Figure 6, relatively close thereto and approximately midway of the height of the barrel, the pipe being suitably supported by the standards 41. The pipe 40 is adapted to discharge blasts of hot air through the openings 42, Figure 7, and which air is directed onto the corn within the barrel as shown in Figure 6. This operation and the effect of the same will be presently described in greater detail. For generating the air which is eventually supplied to pipe 41 a blower 43 is provided having an inlet end for the air indicated by numeral 44 and a discharge end at 45. The blower 43 is suitably driven by the electric motor 46. Discharge end 45 of the blower connects with a vertical heater 47 of any suitable construction and which may be heated by gas through the instrumentality of the burner 48. The hot air from heater 47 is delivered to pipe 40 by the connecting section of pipe 49. As shown in Figure 2, the blower 43, motor 46, and heater 47 are suitably supported by any supporting structure such as the table 50 having the legs 51.

The structure for filling the tumbling barrel and for emptying the same is shown in the sectional views in Figures 4 and 5. The metal rim 15 at the extreme right hand end of the barrel is provided on its exposed face with a plurality of securing studs 54, the studs being suitably threaded into the end rim 15 and it will be observed that a portion of each threaded stud projects forwardly of the rim. The studs are spaced around the rim as shown in Figure 3 and they function as securing means for releasably retaining the end plate 55 in closed position with the end rim 15. For receiving the end plate 55 the end rim 15 is provided with a groove 56 and when the nuts 57 are tightened the end plate is securely held to the end rim, with the plate being disposed within the annular groove 56. For emptying the tumbling barrel it is only necessary to rotate the nuts 57 in a releasing direction which will permit plate 55 to move outwardly although the same will be retained in connected relation with the end rim 15 by means of the threaded studs 54. The emptying operation is facilitated by elevating the left end of the tumbling barrel so that the barrel assumes an inclination of approximately five to ten degrees. The shelled corn within the barrel will automatically leave the barrel during rotation thereof through the opening provided by the end plate 55 and said plate automatically assumes an open spaced position as shown in Figure 5 upon loosening of the nuts 57 by reason of the weight of the corn against the inside of the plate.

The lower half of end plate 55 and associated rim 15 is enclosed within a semicircular cover 58, the said cover having a rear flange 59 directed toward rim 15 and which flange provides the necessary support for the fabric sealing member 60 suitably secured to flange 59 and which has frictional contact with the rolling surface of end rim 15. By means of this fabric sealing member the lower half of the end plate 55 and rim are completely enclosed and in a manner which prevents loss of corn during the discharge from the barrel when end plate 55 is open for this purpose. The semicircular cover 58 is suitably supported in position so as to enclose the lower half of end plate 55 and associated structure by means of brackets 61 and which are in turn suitably secured to the supporting structure for the barrel including the channel members 23 and 24. Said cover 58 is provided with the discharge opening 62 located substantially between the brackets 61 and said discharge opening is disposed over conveyor means indicated in its entirety by 63, having an endless belt 64 by means of which the shelled corn from the barrel is conveyed to other parts of the plant for other operations.

In accordance with the invention it is possible to deliver shelled corn to the tumbling barrel at any time and accordingly the barrel may have rotation during a filling operation as well as during an emptying operation. The end plate 55 is provided with a center opening 65 which is closed by means of the center discs 66 and 67. Disc 66 is located on the inside of end plate 55, being substantially aligned with opening 65 so as to close the opening, whereas center disc 67 is located on the exterior of end plate 55, being likewise aligned with the opening and with disc 66. A plurality of rollers 68 are located between and journalled by the center discs and said rollers are adapted to have rolling contact on the periphery of opening 65. By means of rollers 68 it is possible for end plate 55 to rotate with the structure including the center discs 66 and 67 remaining stationary. Said center discs are secured in operative relation on the respective sides of end plate 55 by means of bolts 70, each bolt passing through both discs and providing journalling means for a roller 68. An opening is formed in each of the center discs 66 and 67, the openings aligning with each other, and the discharge end 71 of the hopper 72 is located in said openings. The hopper is suitably supported by brackets 73 and 74 located on the respective sides of the hopper and which brackets are suitably secured to cover 58. Since end plate 55 has opening and closing movements with respect to the cover 58 it is necessary to provide for limited movement of hopper 72 on the brackets 73 and 74. The flange member 75 fixed to the hopper, and rollers 76 interposed between the flange members and the brackets, permit said limited movement.

End plate 55 is of course closed during the filling operation. The hopper 72 is accordingly positioned as shown in Figure 4, and wherein it will be observed that the hopper is disposed directly under the supply pipe 77 which supplies shelled corn to the hopper. From the hopper the corn is discharged into the tumbling barrel through inlet end 71, the said end extending through aligned openings in the center discs 66 and 67, as has been described. The structure including the center discs and hopper thus remain stationary although the tumbling barrel and end plate 55 may continue to rotate. The processing of the shelled corn continues during the filling and such operation assures a maximum distribution of the corn throughout the mass.

In operation of the processing machine of the invention the same is approximately half filled with shelled corn and during this filling operation it will be understood that the barrel rotates so that the processing continues during the filling operation. The corn from the various bags which may have varying moisture content are therefore distributed throughout the mass within the tumbling barrel. By subjecting the kernels to a controlled atmosphere and by bringing the individual kernels into contact with other kernels the mass is homogenized and the moisture content made substantially uniform.

This application is a division of my copending application Serial No. 682,563, filed July 10, 1946, and entitled Method for Processing Kernels of Popcorn.

The invention is not to be limited to or by details of construction of the particular embodiment thereof illustrated by the drawings as various other forms of the device will of course be apparent to those skilled in the art without departing from the spirit of the invention or the scope of the claims.

What is claimed is:

1. In a corn processing apparatus, in combination, a cylindrical tumbling barrel formed of wire mesh screen and including annular rims in surrounding relation with the wire screen and spaced longitudinally of the barrel, rollers having contact with the rims respectively for supporting the barrel horizontally for rotation on its longitudinal axis, an end plate releasably secured to the barrel at one end thereof and having a closed and an open position with the barrel, said end plate in open position permitting discharge of the contents of the barrel therefrom, a substantially semi-circular housing enclosing the lower portion of said end plate and associated barrel structure, said housing having a discharge opening in the bottom thereof, and a filling hopper located exteriorly of the end plate and having its delivery end extending through the plate for filling the barrel.

2. In a corn processing apparatus, in combination, a cylindrical tumbling barrel formed of wire mesh screen and including annular rims secured to and in surrounding relation with the wire screen and spaced longitudinally of the barrel with a rim being located at the respective ends of the barrel, rollers having contact with the rims respectively for supporting the barrel horizontally for rotation on its longitudinal axis, an end plate releasably secured to an end rim of the barrel at one end thereof and having a closed and an open position with the barrel, said end plate in open position permitting discharge of the contents of the barrel therefrom, said end plate having a central opening, means associated with the end plate for closing said opening in a manner permitting relative rotation of the parts whereby said closer means may remain stationary while the end plate and thus the barrel rotate, and a filling hopper located exteriorly of the end plate and having its delivery end fixed to and extending through said closer means for filling the barrel.

3. In a corn processing apparatus, in combination, a cylindrical tumbling barrel formed of wire mesh screen and including annular rims secured to and in surrounding relation with the wire screen and spaced longitudinally of the barrel with a rim being located at the respective ends of the barrel, rollers having contact with the rims respectively for supporting the barrel horizontally for rotation on its longitudinal axis, an end plate releasably secured to an end rim of the barrel at one end thereof and having a closed and an open position with the barrel, a substantially semi-circular housing enclosing the lower portion of the end plate and associated barrel structure, said housing having a discharge opening in the bottom thereof, said end plate having a central opening therein, means associated with the end plate for closing said opening in a manner permitting relative rotation of the parts whereby said closer means may remain stationary while the end plate and thus the barrel rotate, and a filling hopper located exteriorly of the end plate and having its delivery end fixed to and extending through said closer means for filling the barrel.

4. In apparatus for processing kernels of popcorn for conditioning them for popping, in combination, a cylindrical tumbling barrel of wire mesh screen suitably reinforced by annular and longitudinal members, supporting structure including rollers for supporting the barrel for rotation on its longitudinal axis, an end plate releasably secured to the discharge end of the barrel and having a closed and an open position with the barrel, said end plate in open position providing a peripheral opening at this end of the barrel permitting discharge of the contents of the barrel therefrom, means located adjacent the discharge end of the barrel for pivotally mounting the supporting structure for tilting movement about a horizontal axis, mechanism located adjacent the opposite ends of the barrel for elevating said end whereby the barrel may be tilted to facilitate discharge, and a filling hopper located exteriorly of the end plate and having its delivery end extending through the plate for filling the barrel.

5. In apparatus for processing kernels of popcorn for conditioning them for popping, in combination, a cylindrical tumbling barrel of wire mesh screen having metal rims secured to and encircling the wire screening, supporting structure including rollers having contact with the metal rims respectively for supporting the barrel for rotation on its longitudinal axis, an end plate releasably secured to the discharge end of the barrel and having a closed and an open position with the barrel, said end plate in open position providing a peripheral opening at this end of the barrel permitting discharge of the contents of the barrel therefrom, means located adjacent the discharge end of the barrel and extending transversely of the same for pivotally mounting the supporting structure for tilting movement about a horizontal axis, mechanism located adjacent the opposite end of the barrel for elevating said end whereby the barrel may be tilted to facilitate discharge, and a filling hopper located exteriorly of the end plate and having its delivery end extending through the plate for filling the barrel.

JACOB J. KOOMAN.

REFERENCES CITED

The following references are of record in the file of this patent:

UNITED STATES PATENTS

| Number | Name | Date |
|---|---|---|
| 1,174,975 | Fullman | Mar. 14, 1916 |
| 2,018,257 | Urschel | Jan. 13, 1932 |
| 2,174,880 | Hillbish et al. | Oct. 3, 1939 |